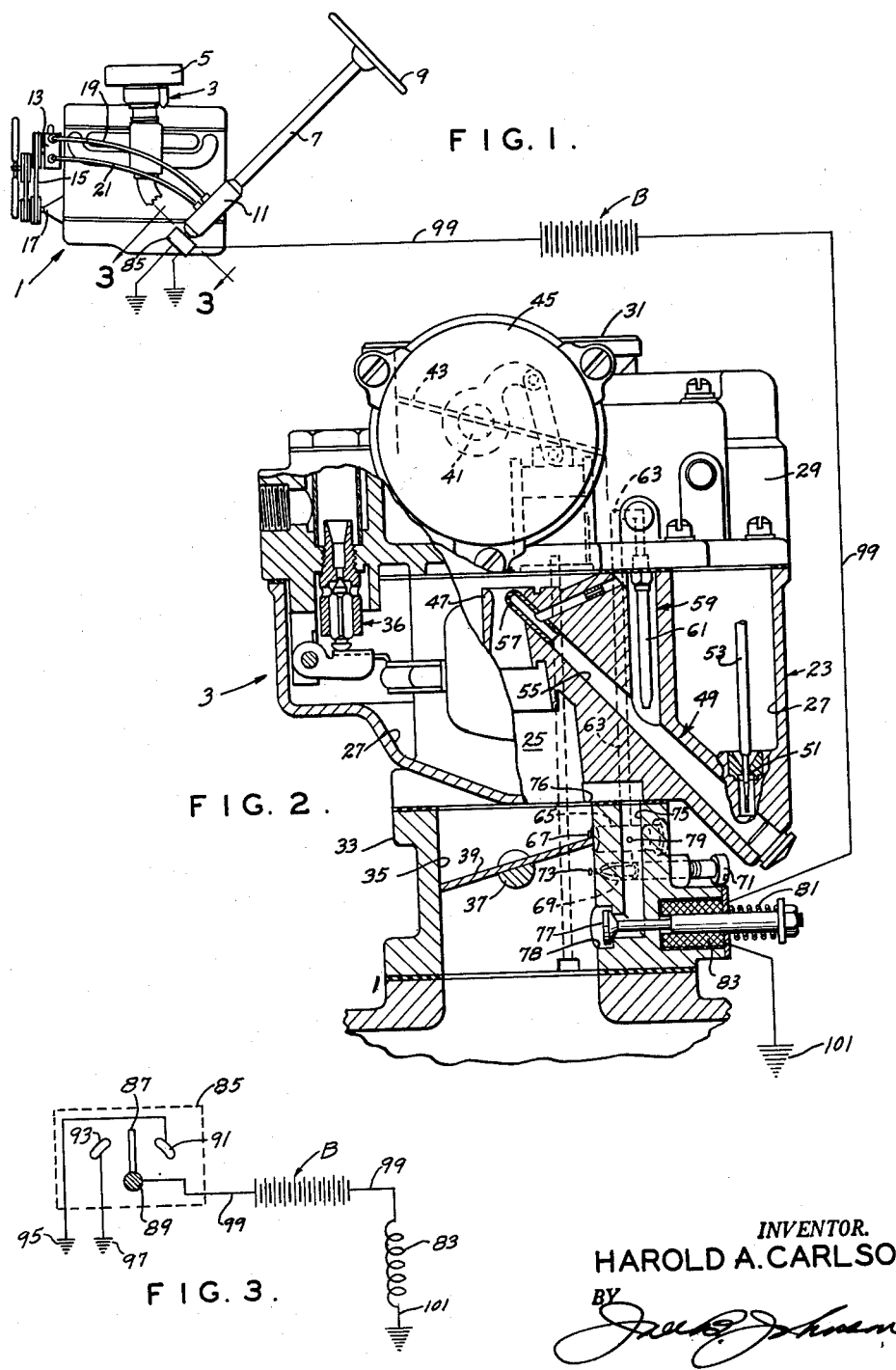

United States Patent Office 3,146,844
Patented Sept. 1, 1964

1

3,146,844
ENGINE IDLE SPEED CONTROL

Harold A. Carlson, Brentwood, Mo., assignor to ACF Industries, Incorporated, New York, N.Y., a corporation of New Jersey Filed May 17, 1962, Ser. No. 195,608

6 Claims. (Cl. 180—77)

This invention relates to means for controlling the speed of an internal combustion engine of an automotive vehicle having an accessory powered from the engine, adapted to prevent stalling of the engine under conditions of high demand of the accessory with attendant increased load on the engine, and more particularly to a speed control system of this character for the engine of an automotive vehicle equipped with a power steering system.

A typical power steering system for an automotive vehicle comprises a hydraulically operated power means for power assist in turning the front wheels of the vehicle. This power means is supplied with hydraulic fluid (such as oil) under pressure by a hydraulic pump driven by the engine of the vehicle. When the front wheels of the vehicle equipped with such a power steering system are cramped left or right under conditions of maximum resistance to turning of the wheels, as for example, when parking the vehicle or pulling out of a parking space, the front wheels are cramped left or right with the vehicle at rest, a relatively heavy load is placed on the pump and hence on the engine. Under such conditions, the idle speed of the engine may drop below that necessary to maintain the engine in operation, and the engine will stall.

Accordingly, among the several objects of this invention may be noted the provision of a speed control system for the engine of an automotive vehicle having an accessory powered from the engine (such as a power steering accessory), which functions in response to operation of the accessory (turning of the steering wheel in the case of a power steering accessory) to increase the engine idle speed to tend to prevent stalling of the engine; and the provision of such a speed control system which is economical to provide and reliable in operation. In general, the invention involves the provision in the carburetor for the engine of a by-pass around the throttle of the carburetor, a valve normally closing the by-pass, and means for opening the valve in response to operation of the accessory, the by-pass being in communication with the idle system of the carburetor upstream from the valve. With this arrangement, upon operation of the accessory (such as cramping of the wheels in the case of a power steering accessory), the by-pass is opened for delivery of additional air and fuel over and above that ordinarily delivered at idle by the idle system to increase engine idle speed. When the valve is closed, the by-pass serves to bleed air into the idle system. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a view in side elevation of the engine of an automotive vehicle equipped with a power steering system and a speed control system of this invention;

FIG. 2 is an enlarged view in elevation with parts broken away and shown in section of a carburetor provided in accordance with this invention with a by-pass and valve such as above mentioned; and FIG. 3 is an enlarged diagrammatic view, in effect in section on line 3—3 of FIG. 1, showing a switch component of the speed control system.

2

Corresponding reference characters indicate corresponding parts throughout the several views of the drawings.

Referring to the drawings, there is indicated at 1 in FIG. 1 the internal combustion engine of an automotive vehicle. At 3 is indicated the carburetor for the engine, and at 5 is indicated the air filter on the air horn of the carburetor. The steering column of the vehicle is indicated at 7, and the steering wheel of the vehicle is indicated at 9. A power steering gear is indicated at 11. This may be any one of various conventional hydraulically operated power steering gears. As will be understood, such a power steering gear generally comprises a hydraulic power cylinder supplied with hydraulic fluid (oil) under pressure by a pump 13 driven by a belt 15 from the crankshaft 17 of the engine. Lines for delivering fluid from the pump to the power cylinder and for returning fluid from the cylinder to the fluid reservoir associated with the pump are indicated at 19 and 21. It is inherent in the operation of such a power steering system that the power required for operating the pump is at a minimum when the front wheels of the vehicle are in straight-ahead position, increasing when they are turned left or right, and at a maximum when they are fully cramped to left or right under conditions of maximum resistance to turning of the wheels. When the wheels are so cramped, and in the absence of an engine speed control such as provided by this invention, the increased load of the pump on the engine may cause the idle speed of the engine to decrease to the point where the engine stalls. The control of this invention functions to increase engine idle speed under such conditions to prevent stalling.

Referring now to FIG. 2, the carburetor 3 is shown to comprise a main body 23 formed to provide a vertical mixture conduit 25 and fuel bowl 27, a bowl cover 29 having an air horn 31 for mixture conduit 25, and a throttle body 33 having a throttle bore 35 coaxial with and in continuation of the mixture conduit. A float controlled valve for controlling flow of fuel to the fuel bowl is indicated at 36. A throttle shaft 37 extends across the throttle bore and carries a throttle valve 39, which is constituted by a plate fitting in the bore 35. Extending across the air horn is a choke valve shaft 41 carrying a choke valve 43. A choke control is generally indicated at 45. A boost venturi 47 is provided in the mixture conduit. A so-called high speed fuel system for the carburetor is generally indicated at 49, comprising a metering jet 51 through which fuel may flow from the fuel bowl under control of a metering rod 53 to a passage 55 for delivery through a fuel nozzle 57 into the boost venturi. A carburetor idle system is generally indicated at 59, including an idle fuel tube 61 receiving fuel from the passage 55 and supplying it to a passage 63 which extends down to a hole 65 in the wall of throttle body 33. Hole 65 is plugged at its outer end and opens into the throttle bore via an idle discharge port 67. Below hole 65 is another hole 69 which is in communication with hole 65 via a continuation of passage 63. An idle adjusting needle 71 is threaded in the outer end of hole 69, and the latter opens into the throttle bore below the throttle via an idle needle port 73.

In accordance with this invention, for increasing engine idle speed under the cramped-wheel conditions above mentioned, the carburetor 3 is formed with a supplementary air by-pass passage 75 which extends around the throttle 39, with its upper and lower ends 76 and 78, respectively, in communication with mixture conduit 25. A valve 77 normally closes the by-pass 75. A port 79 upstream from valve 77 provides communication between the by-pass 75 and the idle system 59. As shown, port 79 connects the by-pass 75 and hole 65 of the idle system. A return spring 81 biases valve 77 closed, and an electromagnetic coil 83 is provided for opening the valve against the return spring bias.

Referring now to FIGS. 1 and 2, a control 85 for the electrically actuated valve 77 is shown to comprise a switch 87 on the end of the steering wheel shaft 89, engageable when the steering wheel is turned right with a contact 91 and engageable when the wheel is turned left with a contact 93. These contacts are grounded as indicated at 95 and 97. Coil 83 is connected in series with battery B of the vehicle in a line 99 connected at one end to arm 87 and grounded at its other end as indicated at 101. The arrangement is such that when the steering wheel is turned right, arm 87 closes on contact 91 for energizing coil 83, and when the wheel is turned left, arm 87 closes on contact 93 for energizing coil 83.

Applicant's invention normally becomes operative during an idle or very low speed operating condition of the engine, when the car is being parked and the front wheels are cramped fully in one direction or the other. The throttle valve 39 is either closed or substantially closed under such conditions and fuel is being fed to the engine through the idle ports 73 and 67 under the action of the high manifold vacuum, which is in the order of 18 inches of mercury. During such engine operation, there is insufficient air flow through the venturi 47 to pull fuel through the main nozzle. Under normal conditions of idle or low engine speed, the supply of fuel through the idle system, as described, is sufficient, but is insufficient with the increased load upon the engine of the power steering pump during a cramped-wheel condition.

Therefore, in accordance with the invention, coil 83 is energized to open the by-pass valve 77 whenever the front wheels of the vehicle are cramped left or right sufficiently to swing arm 87 onto contact 91 or contact 93. When valve 77 opens, the high manifold vacuum is effective in by-pass 75 to also induce flow of fuel from the idle system through port 79 into the by-pass. This fuel flow into the by-pass mixes with the by-passed air and provides greater power to the engine by the increase in air/fuel mixture supplied. This prevents the engine from stalling under the increased engine load resulting from the demand on pump 13 due to the cramping of the wheels. When valve 77 is closed, port 79 in by-pass 75 acts as an air bleed into the idle system when the engine is operating at normal idle or low speeds.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In an automotive vehicle having an internal combustion engine, a steering wheel, means powered from the engine for assisting the turning of the wheel, a carburetor for the engine having a mixture conduit, a throttle in the mixture conduit, and an idle system formed in said carburetor, said carburetor having a supplementary idling air by-pass around the throttle and separate from said idle system, the ends of the by-pass being in communication with the mixture conduit, and an air by-pass valve normally closing the by-pass, said by-pass being in communication with the idle system upstream from said valve, and means for opening said valve in response to turning of said wheel one way or the other.

2. In an automotive vehicle as set forth in claim 1, communication of the by-pass with the idle system being via a port adapted to bleed air from the by-pass into the idle system when the valve is closed and fuel from said idle system into said by-pass when said valve is opened.

3. In an automotive vehicle as set forth in claim 2, said means for opening the valve being electrically energized and connected in a circuit including switch means adapted to be closed on turning the steering wheel one way or the other.

4. In combination with an automobile having an internal combustion engine, a steering wheel having a shaft for turning the front wheels of the automobile, means powered from the engine for assisting said steering wheel in the turning of said front wheels, a carburetor for the engine, said carburetor having a mixture conduit and an idle system, a throttle in the mixture conduit, said carburetor having an air bypass bore separate from said idle system and around said throttle, said air bypass bore having upper and lower ends in communication with said mixture conduit and having a port located in said bore intermediate said ends establishing communication with said idle system, a valve normally closing the lower end of said bypass, said port being operative to bleed fuel into said bypass from said idle system when said valve is open and to bleed air into said idle system from said bypass when said valve is closed, means for biasing said valve to its normally closed position, electrically energized servo means for opening said valve, an electrical circuit including switch means actuated by said steering wheel for energizing said servo, whereby said valve will be opened in response to turning of said steering wheel to a predetermined angle either right or left.

5. The combination according to claim 4, said switch means including a switch arm mounted on the shaft of said steering wheel and contact means located on either side of said shaft in spaced relation therewith and adapted to be engaged by said switch arm to complete said circuit when said steering wheel is turned a predetermined amount either right or left.

6. In combination with an automobile having an internal combustion engine, a steering wheel having a shaft for turning the front wheels of the automobile, means powered from the engine for assisting said steering wheel in the turning of said front wheels, a carburetor for the engine, said carburetor having a mixture conduit and an idle system, said idle system including a plurality of ports communicating with said mixture conduit, a throttle in said mixture conduit, said carburetor having an auxiliary air bypass bore separate from said idle system and around said throttle and said idle system ports, said air bypass bore having upper and lower ends in communication with said mixture conduit and having a port located in said bore intermediate said ends establishing communication with said idle system, a valve normally closing the lower end of said bypass bore, said air bypass port being operative to bleed fuel into said bypass bore from said idle system when said valve is open and to bleed air into said idle system from said air bypass bore when said valve is closed, means for biasing said valve to its normally closed position, electrically energized servo means for opening said valve, an electrical circuit including switch means actuated by said steering wheel for energizing said servo, whereby said valve will be opened in response to turning of said steering wheel to a predetermined angle either right or left.

References Cited in the file of this patent

UNITED STATES PATENTS

| | | |
|---|---|---|
| 2,296,646 | Matulaitis | Sept. 22, 1942 |
| 2,913,921 | Gordon | Nov. 24, 1959 |
| 2,929,226 | Baker et al. | Mar. 22, 1960 |
| 3,022,849 | Braun | Feb. 27, 1962 |
| 3,042,134 | Majewski | July 3, 1962 |
| 3,103,128 | Gordon | Sept. 10, 1963 |

OTHER REFERENCES

Carter 4-Barrel Carburetor Model AFB; "1961 Buick Chassis Service Manual," pages 3–37 to 3–40; Sept. 5, 1961.